US 9,944,845 B2
Apr. 17, 2018

(12) United States Patent
Tanguay et al.

(54) PROPPANT

(71) Applicant: BASF SE, Ludwigshafen (DE)

(72) Inventors: Christopher M. Tanguay, Trenton, MI (US); Yeonsuk Roh, Canton, MI (US); Rajesh Kumar, Riverview, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/775,905

(22) PCT Filed: Mar. 13, 2014

(86) PCT No.: PCT/US2014/025390
§ 371 (c)(1),
(2) Date: Sep. 14, 2015

(87) PCT Pub. No.: WO2014/151294
PCT Pub. Date: Sep. 25, 2014

(65) Prior Publication Data
US 2016/0032179 A1    Feb. 4, 2016

Related U.S. Application Data

(60) Provisional application No. 61/790,489, filed on Mar. 15, 2013.

(51) Int. Cl.
*C09K 8/80*    (2006.01)
*C09K 8/62*    (2006.01)

(52) U.S. Cl.
CPC ............. *C09K 8/805* (2013.01); *C09K 8/62* (2013.01)

(58) Field of Classification Search
None
See application file for complete search history.

(56) References Cited

U.S. PATENT DOCUMENTS

| | | | |
|---|---|---|---|
| 4,247,666 A * | 1/1981 | Mochizuki | C08G 18/7642 525/124 |
| 4,532,052 A | 7/1985 | Weaver et al. | |
| 5,115,072 A | 5/1992 | Nava et al. | |
| 5,180,782 A | 1/1993 | Stone et al. | |
| 6,476,170 B1 | 11/2002 | Roth et al. | |
| 7,270,879 B2 | 9/2007 | McCrary | |
| 7,845,409 B2 | 12/2010 | Shinbach et al. | |
| 2004/0162392 A1 | 9/2004 | Kaai et al. | |
| 2005/0287484 A1 | 12/2005 | Yano et al. | |
| 2007/0114030 A1 | 5/2007 | Todd et al. | |
| 2007/0144736 A1 | 6/2007 | Shinbach et al. | |
| 2007/0181302 A1 | 8/2007 | Bicerano | |
| 2009/0095472 A1 | 4/2009 | Andersson et al. | |
| 2009/0139719 A1 | 6/2009 | Luo et al. | |
| 2010/0065271 A1 * | 3/2010 | McCrary | C09K 8/805 166/278 |
| 2011/0297383 A1 * | 12/2011 | Tanguay | C09K 8/62 166/308.1 |
| 2014/0060833 A1 | 3/2014 | Kuhlmann et al. | |
| 2014/0345864 A1 | 11/2014 | Winter et al. | |

FOREIGN PATENT DOCUMENTS

| | | |
|---|---|---|
| CN | 101346324 A | 1/2009 |
| CN | 102203211 A | 9/2011 |
| CN | 102220126 A | 10/2011 |
| CN | 104039920 A | 9/2014 |
| DE | 10 2010 051 817 A1 | 5/2012 |
| WO | WO 03/066704 A1 | 8/2003 |
| WO | WO 2005/012393 A1 | 2/2005 |
| WO | WO 2008/088449 A2 | 7/2008 |
| WO | WO 2011/050046 A1 | 4/2011 |
| WO | WO 2012/151109 A1 | 11/2012 |
| WO | WO 2013/036350 A1 | 3/2013 |
| WO | WO 2014/144516 A1 | 9/2014 |
| WO | WO 2014/150440 A1 | 9/2014 |

OTHER PUBLICATIONS

International Search Report for Application No. PCT/US2014/028960 dated May 27, 2014, 3 pages.
International Search Report for Application No. PCT/US2014/023270 dated Jun. 11, 2014, 3 pages.
International Search Report for Application No. PCT/US2014/025390 dated Jun. 11, 2014, 3 pages.
Arkema Inc., "Norsocryl", extracted from http://www.arkema.com/sites/group/en/products/detailed_sheets/acrylics on Jan. 18, 2013.
Arkema Inc., "Luperox Technical Information", May 2009, pp. 1-2.
BASF, "Acrodur 950 L Fiber Bonding Technical Data Sheet", Oct. 2009, pp. 1-3.
BASF, "Safety Data Sheet B-82", Jun. 25, 2007, pp. 1-6.
BASF, "Safety Data Sheet B-91", Dec. 8, 2011, pp. 1-7.
BASF, "Safety Data Sheet Joncryl 70", Apr. 9, 2007, pp. 1-6.
BASF, "Safety Data Sheet Joncryl 569", Mar. 29, 2007, pp. 1-6.
BASF, "Printing & Packaging Industrial Coatings Technical Data Sheet—Joncryl 690", Nov. 2010, pp. 1-3.
BASF, "Safety Data Sheet JPX-S028", Feb. 8, 2010, pp. 1-6.
BASF, "Luwipal 066 LF Technical Information", Apr. 2003, 4 pages.
BASF Corporation, Urethane Chemicals CASE Product Line, 2010, 1-11.
BASF Polyurethanes North America, "Pluracol CASE Polyols", 2011, 6 Pages, downloaded from http://www.polyurethanes.basf.us/products/name/pluracol/pluracolcase.
BASF Corporation, "Pluracol TP Series", 2000, 1 page.
(Continued)

*Primary Examiner* — Jeffrey Washville
(74) *Attorney, Agent, or Firm* — DLA Piper LLP (US)

(57) ABSTRACT

A proppant includes a particle present in an amount of from 90 to 99.5 percent by weight and a polymeric coating disposed about the particle and present in an amount of from 0.5 to 10 percent by weight, based on the total weight of the proppant. The polymeric coating is formed from a curable composition comprising an isocyanate, an acrylate, and a polyol. A method of forming the proppant includes the steps of combining the isocyanate, the acrylate, and the polyol to form the curable composition, coating the particle with the curable composition, and curing the curable composition to form the polymeric coating.

18 Claims, No Drawings

(56) References Cited

OTHER PUBLICATIONS

Chemical Book, "CAS Database: 141-32-2", extracted from http://www.chemicalbook.com/CASEN_141-32-2.htm on Jan. 18, 2013.
CVC Thermoset Specialties, "ERISYS GA-240 Technical Bulletin", Aug. 21, 2008, 1 page.
European Committee for Standardization, "Petroleum and Natural Gas Industries—Completion Fluids and Materials—Part 2: Measurement of Properties of Proppants Used in Hydraulic Fracturing and Gravel-Packing Operations—ISO 13503:2:2006," Nov. 2006, pp. 1-33.
Evonik Industries, "GPS Safety Summary", Version 1, Jun. 2013, pp. 1-5.
Ineos Products, "INEQS Melamines", extracted from http://www.ineos.com/Products on Mar. 13, 2014, 2 pages.
National Institute of Standards and Technology, "Hexa(methoxymethyl)melamine", extracted from http://webbook.nist.gov on Jan. 17, 2013, pp. 1-4.
Wamser, Dr. Carl C., "Organic Chemistry III—Chapter 23—Polymers", Portland State University, Chem 336, Spring 2000, pp. 1-23, extracted from http://web.pdx.edu/wamserc/C336S00/23notes.htm on Jan. 18, 2013.
English language abstract for CN 101346324 extracted from espacenet.com database on Jul. 27, 2017, 1 page.
English language abstract for CN 102203211 extracted from espacenet.com database on Jul. 27, 2017, 1 page.
English language abstract and machine-assisted English translation for CN 102220126 extracted from espacenet.com database on Jul. 27, 2017, 13 pages.
English language abstract for CN 104039920 extracted from espacenet.com database on Jul. 27, 2017, 2 pages.

\* cited by examiner

PROPPANT

RELATED APPLICATIONS

This application is the National Stage of International Patent Application No. PCT/US2014/025390, filed on Mar. 13, 2014, which claims priority to and all the advantages of U.S. Patent Application No. 61/790,489, filed on Mar. 15, 2013, the contents of which are incorporated herein by reference.

FIELD OF THE DISCLOSURE

The subject disclosure generally relates to a proppant and a method of forming the proppant. More specifically, the subject disclosure relates to a proppant which includes a particle and a polymeric coating disposed on the particle, and which is used during hydraulic fracturing of a subterranean formation.

DESCRIPTION OF THE RELATED ART

Domestic energy needs in the United States currently outpace readily accessible energy resources, which has forced an increasing dependence on foreign petroleum fuels, such as oil and gas. At the same time, existing United States energy resources are significantly underutilized, in part due to inefficient oil and gas procurement methods and a deterioration in the quality of raw materials such as unrefined petroleum fuels.

Petroleum fuels are typically procured from subsurface reservoirs via a wellbore. Petroleum fuels are currently procured from low-permeability reservoirs through hydraulic fracturing of subterranean formations, such as bodies of rock having varying degrees of porosity and permeability. Hydraulic fracturing enhances production by creating fractures that emanate from the subsurface reservoir or wellbore, and provides increased flow channels for petroleum fuels. During hydraulic fracturing, specially-engineered carrier fluids are pumped at high pressure and velocity into the subsurface reservoir to cause fractures in the subterranean formations. A propping agent, i.e., a proppant, is mixed with the carrier fluids to keep the fractures open when hydraulic fracturing is complete. The proppant typically includes a particle and a coating disposed on the particle. The proppant remains in place in the fractures once the high pressure is removed, and thereby props open the fractures to enhance petroleum fuel flow into the wellbore. Consequently, the proppant increases procurement of petroleum fuel by creating a high-permeability, supported channel through which the petroleum fuel can flow.

However, many existing proppants exhibit inadequate thermal stability for high temperature and pressure applications, e.g. wellbores and subsurface reservoirs having temperatures greater than 21.1° C. (70° F.) and pressures, i.e., closure stresses, greater than 51.7 MPa (7,500 psi). As an example of a high temperature application, certain wellbores and subsurface reservoirs throughout the world have temperatures of about 190.6° C. (375° F.) and 282.2° C. (540° F.). As an example of a high pressure application, certain wellbores and subsurface reservoirs throughout the world have closure stresses that exceed 82.7 MPa (12,000 psi) or even 96.5 MPa (14,000 psi). As such, many existing proppants, which include coatings, have coatings such as epoxy or phenolic coatings, which melt, degrade, and/or shear off the particle in an uncontrolled manner when exposed to such high temperatures and pressures. Also, many existing proppants do not include active agents, such as microorganisms and catalysts, to improve the quality of the petroleum fuel recovered from the subsurface reservoir.

Further, many existing proppants include coatings having inadequate crush resistance. That is, many existing proppants include non-uniform coatings that include defects, such as gaps or indentations, which contribute to premature breakdown and/or failure of the coating. Since the coating typically provides a cushioning effect for the proppant and evenly distributes high pressures around the proppant, premature breakdown and/or failure of the coating undermines the crush resistance of the proppant. Crushed proppants cannot effectively prop open fractures and often contribute to impurities in unrefined petroleum fuels in the form of dust particles.

Moreover, many existing proppants also exhibit unpredictable consolidation patterns and suffer from inadequate permeability in wellbores, i.e., the extent to which the proppant allows the flow of petroleum fuels. That is, many existing proppants have a lower permeability and impede petroleum fuel flow. Further, many existing proppants consolidate into aggregated, near-solid, non-permeable proppant packs and prevent adequate flow and procurement of petroleum fuels from subsurface reservoirs.

Also, many existing proppants are not compatible with low-viscosity carrier fluids having viscosities of less than about 3,000 cps at 80° C. Low-viscosity carrier fluids are typically pumped into wellbores at higher pressures than high-viscosity carrier fluids to ensure proper fracturing of the subterranean formation. Consequently, many existing coatings fail mechanically, i.e., shear off the particle, when exposed to high pressures or react chemically with low-viscosity carrier fluids and degrade.

Finally, many existing proppants are coated via noneconomical coating processes and therefore contribute to increased production costs. That is, many existing proppants require multiple layers of coatings, which results in time-consuming and expensive coating processes.

Due to the inadequacies of existing proppants, there remains an opportunity to provide an improved proppant.

SUMMARY OF THE DISCLOSURE AND ADVANTAGES

The subject disclosure provides a proppant for hydraulically fracturing a subterranean formation. The proppant includes a particle present in an amount of from 90 to 99.5 percent by weight and a polymeric coating disposed about the particle and present in an amount of from 0.5 to 10 percent by weight, based on the total weight of the proppant. The polymeric coating is formed from a curable composition comprising an isocyanate, an acrylate, and a polyol.

A method of forming the proppant includes the steps of combining the isocyanate, the acrylate, and the polyol to form the curable composition, coating the particle with the curable composition, and curing the curable composition to form the polymeric coating.

Advantageously, the proppant of the subject disclosure improves upon the performance of existing proppants.

DETAILED DESCRIPTION OF THE DISCLOSURE

The subject disclosure includes a proppant, a method of forming, or preparing, the proppant, a method of hydraulically fracturing a subterranean formation, and a method of filtering a fluid. The proppant is typically used, in conjunction with a carrier fluid, to hydraulically fracture the subterranean formation which defines a subsurface reservoir (e.g. a wellbore or reservoir itself). Here, the proppant props open the fractures in the subterranean formation after the hydraulic fracturing. In one embodiment, the proppant may also be used to filter unrefined petroleum fuels, e.g. crude oil, in fractures to improve feedstock quality for refineries. However, it is to be appreciated that the proppant of the subject disclosure can also have applications beyond hydraulic fracturing and crude oil filtration, including, but not limited to, water filtration and artificial turf.

The proppant includes a particle and a polymeric coating disposed on the particle. As used herein, the terminology "disposed on" encompasses the polymeric coating being disposed about the particle and also encompasses both partial and complete covering of the particle by the polymeric coating. The polymeric coating is disposed on the particle to an extent sufficient to change the properties of the particle, e.g. to form a particle having a polymeric coating thereon which can be effectively used as a proppant. As such, any given sample of the proppant typically includes particles having the polymeric coating disposed thereon, and the polymeric coating is typically disposed on a large enough surface area of each individual particle so that the sample of the proppant can effectively prop open fractures in the subterranean formation during and after the hydraulic fracturing, filter crude oil, etc. The polymeric coating is described additionally below.

Although the particle may be of any size, the particle typically has a particle size distribution of from 10 to 100 mesh, alternatively from 20 to 70 mesh, as measured in accordance with standard sizing techniques using the United States Sieve Series. That is, the particle typically has a particle size of from 149 to 2,000, alternatively from 210 to 841, µm. Particles having such particle sizes allow less polymeric coating to be used, allow the polymeric coating to be applied to the particle at a lower viscosity, and allow the polymeric coating to be disposed on the particle with increased uniformity and completeness as compared to particles having other particle sizes.

Although the shape of the particle is not critical, particles having a spherical shape typically impart a smaller increase in viscosity to a hydraulic fracturing composition than particles having other shapes, as set forth in more detail below. The hydraulic fracturing composition is a mixture comprising the carrier fluid and the proppant. Typically, the particle is either round or roughly spherical.

The particle is present in the proppant in an amount of from 90 to 99.5, alternatively from 94 to 99.3, alternatively from 94 to 99.0, alternatively from 96 to 99, percent by weight based on the total weight of the proppant. The amount of particle present in the proppant may vary outside of the ranges above, but is typically both whole and fractional values within these ranges.

The particle typically contains less than 1 percent by weight of moisture, based on the total weight of the particle. Particles containing higher than 1 percent by weight of moisture typically interfere with sizing techniques and prevent uniform coating of the particle.

Suitable particles for purposes of the subject disclosure include any known particle for use during hydraulic fracturing, water filtration, or artificial turf preparation. Non-limiting examples of suitable particles include minerals, ceramics such as sintered ceramic particles, sands, nut shells, gravels, mine tailings, coal ashes, rocks (such as bauxite), smelter slag, diatomaceous earth, crushed charcoals, micas, sawdust, wood chips, resinous particles, polymeric particles, and combinations thereof. It is to be appreciated that other particles not recited herein may also be suitable for the purposes of the subject disclosure.

Sand is a preferred particle and when applied in this technology is commonly referred to as frac, or fracturing, sand. Examples of suitable sands include, but are not limited to, Badger sand, Brady sand, Northern White sand, Texas Hickory sand, and Ottawa sand. Based on cost and availability, inorganic materials such as sand and sintered ceramic particles are typically favored for applications not requiring filtration.

A specific example of a sand that is suitable as a particle for the purposes of the subject disclosure is Ottawa sand, commercially available from U.S. Silica Company of Berkeley Springs, W. Va. Yet another specific example of a sand that is suitable as a particle for the purposes of this disclosure is Wisconsin sand, commercially available from Badger Mining Corporation of Berlin, Wis. Particularly preferred sands for application in this disclosure are Ottawa and Wisconsin sands. Ottawa and Wisconsin sands of various sizes, such as 30/50, 20/40, 40/70, and 70/140 can be used.

Specific examples of suitable sintered ceramic particles include, but are not limited to, aluminum oxide, silica, bauxite, and combinations thereof. The sintered ceramic particle may also include clay-like binders.

An active agent may also be included in the particle. In this context, suitable active agents include, but are not limited to, organic compounds, microorganisms, and catalysts. Specific examples of microorganisms include, but are not limited to, anaerobic microorganisms, aerobic microorganisms, and combinations thereof. A suitable microorganism for the purposes of the subject disclosure is commercially available from LUCA Technologies of Golden, Colo. Specific examples of suitable catalysts include fluid catalytic cracking catalysts, hydroprocessing catalysts, and combinations thereof. Fluid catalytic cracking catalysts are typically selected for applications requiring petroleum gas and/or gasoline production from crude oil. Hydroprocessing catalysts are typically selected for applications requiring gasoline and/or kerosene production from crude oil. It is also to be appreciated that other catalysts, organic or inorganic, not recited herein may also be suitable for the purposes of the subject disclosure.

Such additional active agents are typically favored for applications requiring filtration. As one example, sands and sintered ceramic particles are typically useful as a particle for support and propping open fractures in the subterranean formation which defines the subsurface reservoir, and, as an active agent, microorganisms and catalysts are typically useful for removing impurities from crude oil or water. Therefore, a combination of sands/sintered ceramic particles and microorganisms/catalysts as active agents are particularly preferred for crude oil or water filtration.

Suitable particles for purposes of the present disclosure may even be formed from resins and polymers. Specific examples of resins and polymers for the particle include, but are not limited to, polyurethanes, polycarbodiimides, polyureas, acrylates, polyvinylpyrrolidones, acrrylonitrile-butadiene styrenes, polystyrenes, polyvinyl chlorides, fluoroplastics, polysulfides, nylon, polyamide imides, and combinations thereof.

As indicated above, the proppant includes the polymeric coating disposed on the particle. The polymeric coating is selected based on the desired properties and expected operating conditions of the proppant. The polymeric coating may provide the particle with protection from operating temperatures and pressures in the subterranean formation and/or subsurface reservoir. Further, the polymeric coating may protect the particle against closure stresses exerted by the subterranean formation. The polymeric coating may also protect the particle from ambient conditions and minimizes disintegration and/or dusting of the particle. In some embodiments, the polymeric coating may also provide the proppant with desired chemical reactivity and/or filtration capability.

The polymeric coating is formed from a curable composition comprising an isocyanate and an acrylate and optionally a polyol. In a typical embodiment, the polymeric coating is formed from a curable composition comprising an isocyanate, an acrylate, and a polyol. The curable composition is formulated and formed such that the physical properties of the polymeric coating, such as hardness, strength, toughness, creep, and brittleness are optimized.

The curable composition includes the isocyanate. The isocyanate may be a polyisocyanate having two or more functional groups, e.g. two or more NCO functional groups. Suitable isocyanates for purposes of the present disclosure include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate pre-polymer. The isocyanate pre-polymer is typically a reaction product of an isocyanate and a polyol and/or a polyamine. The isocyanate used in the pre-polymer can be any isocyanate as described above. The polyol used to form the pre-polymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the pre-polymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used to prepare the polymeric coating include, but are not limited to, toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-dissocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable polymeric coatings can also be prepared from aromatic diisocyanates or isocyanates having one or two aryl, alkyl, arakyl or alkoxy substituents wherein at least one of these substituents has at least two carbon atoms. Specific examples of suitable isocyanates include LUPRANATE® L5120, LUPRANATE® M, LUPRANATE® ME, LUPRANATE® MI, LUPRANATE® M20, and LUPRANATE® M70, all commercially available from BASF Corporation of Florham Park, N.J.

In a preferred embodiment, the isocyanate has an NCO content of from 20 to 45, alternatively from 25 to 35, weight percent. In a specific embodiment, the isocyanate is a polymeric isocyanate, such as LUPRANATE® M20. LUPRANATE® M20 includes polymeric diphenylmethane diisocyanate and has an NCO content of 31.5 weight percent. In another specific embodiment, the isocyanate is a diphenylmethane diisocyanate, such as LUPRANATE® MI. LUPRANATE® MI includes diphenylmethane diisocyanate and has an NCO content of about 33.5 weight percent.

The isocyanate is typically included in the curable composition in an amount of from 10 to 90, alternatively from 20 to 70, percent by weight based on the total weight of all components used to form the curable composition. The amount of isocyanate used may vary outside of the ranges above, but is typically both whole and fractional values within these ranges. Further, it is to be appreciated that more than one isocyanate may be included in the curable composition, in which case the total amount of all isocyanates included is within the above ranges.

The curable composition also includes the acrylate. Of course, the curable composition can include one or more acrylates. As used herein, acrylate refers to both acrylates and methacrylates (the salts and esters of methacrylic acid) and also refers to both monomers and oligomers, polymers, and copolymers which include acrylate units. The use of the acrylate in the curable composition allows for the curing of the composition because acrylates typically include double bonds which are chemically reactive.

The curable composition can include any acrylate known in the art. The curable composition typically includes one or more acrylate monomers. The acrylate monomer may include isocyanate-reactive functional groups, e.g. hydroxy-functional groups, amine-functional groups, and combinations thereof. For purposes of the subject disclosure, an isocyanate-reactive functional group is any functional group that is reactive with at least one of the isocyanate groups of the isocyanate. In one embodiment, the curable composition includes an acrylate monomer which includes isocyanate-reactive functional groups and also an acrylate monomer that does not include isocyanate-reactive functional groups.

The curable composition can include a $C_1$ to $C_{20}$ alkyl (meth)acrylate. The i) $C_1$ to $C_{20}$ alkyl (meth)acrylate can be selected from the group of methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth) acrylate, benzyl (meth)acrylate, 2-ethylhexyl (meth)acrylate, heptyl (meth)acrylate, n-octyl (meth)acrylate, nonyl (meth)acrylate, decyl (meth)acrylate, undecyl (meth)acrylate, dodecyl (meth)acrylate, tridecyl (meth)acrylate, lauryl (meth)acrylate, stearyl (meth)acrylate, isobornyl (meth) acrylate, norbornyl (meth)acrylate, 4-tertbutylcyclohexyl (meth)acrylate, 3,3,5-trimethylcyclohexyl (meth)acrylate, dimethyl maleate, n-butyl maleate, propylene glycol (meth) acrylate, carbodiimide (meth)acrylate, t-butylaminoethyl (meth)acrylate, 2-t-butylaminoethyl (meth)acrylate, N,N-dimethylaminoethyl (meth)acrylate, 1,4 butanediol dimethyacrylate, and combinations thereof.

In a preferred embodiment, the curable composition includes an acrylate which includes hydroxy- and/or an amine-functionality. Suitable, non-limiting examples of hydroxy-functional acrylate monomers include glycerol monomethacrylate, 2-hydroxyethyl acrylate (HEA), hydroxyethyl methacrylate (HEMA), 2-hydroxypropyl methacrylate (HPMA), hydroxybutyl methacrylate (HBMA), N-(2-hydroxypropyl)methacrylamide, poly ethoxy (10) ethyl methacrylate (HEMA 10), pentaerythritol triacrylate, and combinations thereof. The curable composition may also include hydroxypolyethoxy (10) allyl ether, poly(propylene glycol), 1,1,1-trimethylolpropane diallyl ether (mono/di/triallyl mixture), 1,1,1-trimethylolpropane mono-allyl ether, and combinations thereof.

In a preferred embodiment the curable composition comprises a hydroxyalkyl methacrylate. Specific non-limiting examples of hydroxyalkyl methacrylates include HEA, HEMA, HPMA, and HBMA.

The curable composition can also include an acrylate copolymer. The copolymer can include hydroxy- and/or an amine-functionality. As is known in the art, a polymer is formed from many "mers" or units. The term unit is used herein to describe a unit formed from a particular monomer. For example, a 2-ethylhexyl acrylate unit within a polymer chain which is formed from 2-ethylhexyl acrylate. Further, the copolymer is described as including various percent by weight units, as used throughout this disclosure, percent by weight units refers to percent by weight units, based on the total weight of the copolymer.

In one embodiment, the curable composition includes an acrylate copolymer which includes both styrene and acrylate units. In this embodiment, the styrene units of the copolymer are typically selected from the group of styrene units, α-methylstyrene units, and combinations thereof. The acrylate units are typically selected from the group of methacrylate units, methyl methacrylate units, ethyl methacrylate units, butyl methacrylate units, propyl methacrylate units, methacrylic acid units, acrylic acid units, hydroxyethyl methacrylate units, glycidyl methacrylate units, 2-ethylhexyl acrylate units, and combinations thereof.

The acrylate is typically included in the curable composition in an amount of from 10 to 70, alternatively from 15 to 50, percent by weight based on the total weight of all components used to form the curable composition. The amount of acrylate may vary outside of the ranges above, but is typically both whole and fractional values within these ranges. Further, it is to be appreciated that more than one acrylate may be included in the curable composition, in which case the total amount of all acrylate included is within the above ranges.

The curable composition optionally includes a polyol. The curable composition can include any polyol known in the art. Of course, the curable composition may include one or more polyols. The polyol includes one or more OH functional groups, typically at least two OH functional groups. Typically, the polyol is selected from the group of polyether polyols, polyester polyols, polyether/ester polyols, and combinations thereof; however, other polyols may also be employed.

The polyol typically has a nominal functionality of greater than 1.5, alternatively from 1.5 to 6, alternatively from 2 to 5, alternatively from 2 to 4.5, alternatively from 2 to 4; a number average molecular weight of from 200 to 15,000, alternatively from 200 to 8,000, alternatively from 300 to 5,000, g/mol; a hydroxyl number of from 30 to 500, alternatively from 200 to 500, alternatively from 350 to 450, mg KOH/g; and a viscosity at 25° C. of from 300 to 2,000, alternatively from 5 to 100, alternatively from 300 to 700, cps at 25° C. when tested in accordance with DIN EN ISO 3219. It should be appreciated that more than one polyol may be included in the curable composition, in which case the average values of all polyols included is within the above ranges.

In one embodiment, the polyol comprises a polyether polyol. The polyether polyol typically has a weight average molecular weight of from 200 to 5,000, alternatively from 300 to 4,000, alternatively from 300 to 1,000, alternatively from 300 to 500, g/mol. In certain embodiments, the polyether polyol is a polyether triol. As known in the art, polyether polyols are generally produced by reacting an alkylene oxide with an initiator in the presence of a catalyst, such as a basic catalyst or a double metal cyanide (DMC) catalyst. In certain embodiments the polyether polyol of the curable composition comprises a polyether triol or a polyether tetraol. In these embodiments, the chains of the polyether polyol comprise random and/or repeating units formed from EO, PO, and/or BO, and the terminal caps of the polyether polyol typically comprise PO groups, but may also comprise EO or BO groups, or any combination of EO, PO, and BO groups. In this embodiment, the polyether polyol typically has a hydroxyl number of from 35 to 750, alternatively from 60 to 650, alternatively from 200 to 600, mg KOH/g. Suitable polyether polyols are commercially available from BASF of Florham Park, N.J. under the trade name PLURACOL®.

In one specific embodiment, the curable composition includes a tri-functional polyether polyol formed via the reaction of trimethylol propane and propylene oxide, having a molecular weigh of about 400, a hydroxyl number of from 383 to 413 mg KOH/g, and a viscosity at 25° C. of 600 cps.

In another specific embodiment, the curable composition includes a tetra-functional polyether polyol formed via the reaction of tetrol glycol and propylene oxide, having a molecular weigh of about 400, a hydroxyl number of from 500 to 600 mg KOH/g, and a viscosity at 25° C. of 2000 cps.

In another specific embodiment, the curable composition includes a bi-functional polyol formed via the reaction of propylene oxide and propylene glycol, having hydroxyl number of from 102 to 112 mg KOH/g and a viscosity at 25° C. of 150 cps.

In yet another specific embodiment, the curable composition includes a tri-functional polyol having a hydroxyl number of from 920 mg KOH/g and a viscosity at 25° C. of 3400 cps.

It is believed that polyols having a higher functionality may help improve the hydrolytic resistance of the polymeric coating. Accordingly, in a one embodiment, the curable composition includes a sucrose initiated polyether polyol having number average molecular weight of from 460 to 1200, alternatively from 530 to 930 g/mol; having a hydroxyl number of from 280 to 570, alternatively from 310 to 500 mg KOH/g; and having a functionality of from 4 to 6.5, alternatively from 3.7 to 5.7. In a preferred embodiment, the curable composition includes a sucrose glycerin initiated polyether polyol having hydroxyl number of about 470 mg KOH/g.

The polyol is typically included in the curable composition in an amount of from 10 to 70, alternatively from 15 to 50, percent by weight based on the total weight of all components used to form the curable composition. The amount of polyol may vary outside of the ranges above, but is typically both whole and fractional values within these ranges. Further, it is to be appreciated that more than one polyol may be included in the curable composition, in which case the total amount of all polyol included is within the above ranges.

The curable composition can also include a free radical generator (also referred to as an initiator) such as peroxide and/or an azo initiator. The free radical initiator, if used, initiated the curing of the curable composition. Suitable examples of initiators can be found in "The Handbook of Free Radical Initiators" by E. T. Denisov, T. G. Denisova, and T. S. Pokidova which is incorporated in its entirety herein by reference. Suitable non-limiting examples of azo initiators include 2,2'-Azobis(2-methylbutyronitrile), 2,2'-Azobis[2-methyl-N-(2-hydroxyethyl)propionamide], and sodium persulfate.

If a peroxide initiator is included in the curable composition, a dialkyl- and/or a monoperoxy carbonate-type peroxide can be used. Suitable non-limiting examples of peroxide initiators include organic peroxides such as dialkyl peroxides, diphenyl peroxides, benzoyl peroxide, 1,4-dichlorobenzoyl peroxide, 2,4-dichlorobenzoyl peroxide, di-t-butyl peroxide, dicumyl peroxide, tertiary butyl-perbenzoate, monochlorobenzoyl peroxide, ditertiary-butyl peroxide, 2,5-bis-(tertiarybutyl-peroxy)-2,5-dimethylhexane, tertiary-butyl-trimethyl peroxide, tertiary-butyl-tertiary-butyl-tertiary-triphenyl peroxide, 1,1-bis(t-butylperoxy)-3,3,5-trimethylcyclohexane, t-butyl perbenzoate, tert-butylperoxy 2-ethylhexyl carbonate. In one embodiment, tert-butylperoxy 2-ethylhexyl carbonate is included in the composition Of course, the initiator does not have to be included in the composition. The curable composition can be cured by heat, infrared radiation, ultraviolet radiation, aging/time, internal inclusion in or external exposure to a chemical free radical generator, or any combination thereof to form the polymeric coating.

The curable composition can include a catalyst. The curable composition can include one or more catalysts. That is, the curable composition can include any suitable catalyst or mixtures of catalysts known in the art which catalyze the reaction between the components therein. Generally, the catalyst is selected from the group of amine catalysts, phosphorous compounds, basic metal compounds, carboxylic acid metal salts, non-basic organo-metallic compounds, and combinations thereof. The catalyst can be included in the curable composition in any amount sufficient to catalyze the reaction of the components within the curable composition.

The curable composition can include a "polyurethane catalyst", i.e., a catalyst which catalyzes the reaction between an isocyanate and a hydroxy functional group. For example, the curable composition can include a tertiary amine catalyst, a tin catalyst, etc.

In one embodiment, the curable composition includes 1,8-Diazabicyclo[5.4.0]undec-7-ene, CAS No. 6674-22-2 (DBU).

The curable composition can also include a "polycarbodiimide catalyst", i.e., a catalyst which catalyzes the reaction between two isocyanate functional groups. For example, the curable composition can include phospholene oxide catalyst. Suitable, non limiting examples of phospholene oxides include phospholene oxides such as 3-methyl-1-phenyl-2-phospholene oxide (MPPO), 1-phenyl-2-phospholen-1-oxide, 3-methyl-1-2-phospholen-1-oxide, 1-ethyl-2-phospholen-1-oxide, 3-methyl-1-phenyl-2-phospholen-1-oxide, 3-phospholene isomers thereof, and 3-methyl-1-ethyl-2-phospholene oxide (MEPO). Two particularly suitable phospholene oxides are MPPO and MEPO.

The curable composition can also include an antistatic component. The antistatic component includes one or more antistatic compounds or antistats. The antistat reduces, removes, and prevents the buildup of static electricity on the proppant. The antistat can be a non-ionic antistat or an ionic or amphoteric antistat (which can be further classified as anionic or cationic). Ionic antistats are compounds that include at least one ion, i.e., an atom or molecule in which the total number of electrons is not equal to the total number of protons, giving it a net positive or negative electrical charge. Non-ionic antistats are organic compounds composed of both a hydrophilic and a hydrophobic portion. Of course, the antistatic component can include a combination of ionic and non-ionic antistats.

One suitable antistatic component is a quaternary ammonium compound. The quaternary ammonium compound includes a quaternary ammonium cation, often referred to as a quat. Quats are positively charged polyatomic ions of the structure $NR_4+$, R being an alkyl group or an aryl group. Unlike the ammonium ion ($NH_4+$) and the primary, secondary, or tertiary ammonium cations, quats are permanently charged, independent of the pH of their solution.

One such quaternary ammonium compound is dicocoyl ethyl hydroxyethylmonium methosulfate. Dicocoyl ethyl hydroxyethylmonium methosulfate is the reaction product of triethanol amine, fatty acids, and methosulfate.

Notably, dicocoyl ethyl hydroxyethylmonium methosulfate is a cationic antistat having a cationic-active matter content of 74 to 79 percent when tested in accordance with International Organization for Standardization ("ISO") 2871-1:2010. ISO 2871 specifies a method for the determination of the cationic-active matter content of high-molecular-mass cationic-active materials such as quaternary ammonium compounds in which two of the alkyl groups each contain 10 or more carbon atoms, e.g. distearyl-dimethylammonium chlorides, or salts of imidazoline or 3-methylimidazoline in which long-chain acylaminoethyl and alkyl groups are substituted in the 1- and 2-positions, respectively.

Dicocoyl ethyl hydroxyethylmonium methosulfate has an acid value of not greater than 12 when tested in accordance with ISO 4314-1977 (Surface active agents—Determination of free alkalinity or free acidity—Titrimetric method) and a pH of from 2.5 to 3 when tested in accordance with ISO 4316:1977 (Determination of pH of aqueous solutions—Potentiometric method).

In addition to the quaternary ammonium compound, e.g. dicocoyl ethyl hydroxyethylmonium methosulfate, the antistatic component may further include a solvent, such as propylene glycol. In one such embodiment, the antistatic component includes mixture of dicocoyl ethyl hydroxyethylmonium methosulfate and propylene glycol.

The quaternary ammonium compound can be included in the curable composition or applied to the proppant in an amount of from 50 to 1000, alternatively from 100 to 500, PPM (PPM by weight particle, i.e., 100 grams of particlex 200 PPM surface treatment equals 0.02 grams of surface treatment per 100 grams of particle. The amount of the quaternary ammonium compound present in the surface treatment may vary outside of the ranges above, but is typically both whole and fractional values within these ranges.

The curable composition can also include a silicon-containing adhesion promoter. This silicon-containing adhesion promoter is also commonly referred to in the art as a coupling agent or as a binder agent. The silicon-containing adhesion promoter binds the polymeric coating to the particle. More specifically, the silicon-containing adhesion promoter typically has organofunctional silane groups to improve adhesion of the polymeric coating to the particle. Without being bound by theory, it is thought that the silicon-containing adhesion promoter allows for covalent bonding between the particle and the polymeric coating. In one embodiment, the surface of the particle is activated with the silicon-containing adhesion promoter by applying the silicon-containing adhesion promoter to the particle prior to coating the particle with the curable composition/polymeric coating. In this embodiment, the silicon-containing adhesion promoter can be applied to the particle by a wide variety of application techniques including, but not limited to, spraying, dipping the particles in the polymeric coating, etc. In another embodiment, the silicon-containing adhesion promoter may be added to the curable composition. As such, the particle is then simply exposed to the silicon-containing adhesion promoter when the polymeric coating is applied to the particle. The silicon-containing adhesion promoter is useful for applications requiring excellent adhesion of the polymeric coating to the particle, for example, in applications where the proppant is subjected to shear forces in an aqueous environment. Use of the silicon-containing adhesion promoter provides adhesion of the polymeric coating to the particle such that the polymeric coating will remain adhered to the surface of the particle even if the proppant, including the polymeric coating, the particle, or both, fractures due to closure stress.

Examples of suitable adhesion promoters, which are silicon-containing, include, but are not limited to, glycidoxypropyltrimethoxysilane, aminoethylaminopropyltrimethoxysilane, methacryloxypropyltrimethoxysilane, gamma-aminopropyltriethoxysilane, vinylbenzylaminoethylaminopropyltrimethoxysilane, glycidoxypropylmethyldiethoxysilane, chloropropyltrimethoxysilane, phenyltrimethoxysilane, vinyltriethoxysilane, tetraethoxysilane, methyldimethoxysilane, bis-triethoxysilylpropyldisulfidosilane, bis-triethoxysilylpropyltetrasulfidosilane, phenyltriethoxysilane, aminosilanes, and combinations thereof.

Specific examples of suitable silicon-containing adhesion promoters include, but are not limited to, SILQUEST™ A1100, SILQUEST™ A1110, SILQUEST™ A1120, SILQUEST™ 1130, SILQUEST™ A1170, SILQUEST™ A-189, and SILQUEST™ Y9669, all commercially available from Momentive Performance Materials of Albany, N.Y. A particularly suitable silicon-containing adhesion promoter is SILQUEST™ A1100, i.e., gamma-aminopropyltriethoxysilane. The silicon-containing adhesion promoter may be present in the proppant in an amount of from 0.001 to 5, alternatively from 0.01 to 2, alternatively from 0.02 to 1.25, percent by weight based on the total weight of the proppant. The amount silicon-containing adhesion promoter present in the proppant may vary outside of the ranges above, but is typically both whole and fractional values within these ranges.

The curable composition can also include a wetting agent. The wetting agent is also commonly referred to in the art as a surfactant. The proppant may include more than one wetting agent. The wetting agent may include any suitable wetting agent or mixtures of wetting agents known in the art. The wetting agent is employed to increase a surface area contact between the polymeric coating and the particle. In a typical embodiment, the wetting agent is included in the curable composition. In another embodiment, the surface of the particle is activated with the wetting agent by applying the wetting agent to the particle prior to coating the particle with the polymeric coating.

A suitable wetting agent is BYK® 310, a polyester modified poly-dimethyl-siloxane, commercially available from BYK Additives and Instruments of Wallingford, Conn. The wetting agent may be present in the proppant in an amount of from 0.01 to 10, alternatively from 0.02 to 5, alternatively from 0.02 to 0.04, percent by weight based on the total weight of the proppant. The amount of wetting agent present in the proppant may vary outside of the ranges above, but is typically both whole and fractional values within these ranges.

The polymeric coating of this disclosure may also include the active agent already described above in the context of the particle. In other words, the active agent may be included in the polymeric coating independent of the particle. Once again, suitable active agents include, but are not limited to organic compounds, microorganisms, catalysts, and salts. Suitable non-limiting examples of salts include sodium perboate and sodium persulfate.

The curable composition may also include various additives. Suitable additives include, but are not limited to, blowing agents, blocking agents, dyes, pigments, diluents, catalysts, solvents, specialized functional additives such as antioxidants, ultraviolet stabilizers, biocides, fire retardants, fragrances, and combinations of the group. For example, a pigment allows the polymeric coating to be visually evaluated for thickness and integrity and can provide various marketing advantages. Also, physical blowing agents and chemical blowing agents are typically selected for polymeric coatings requiring foaming. That is, in one embodiment, the coating may include a foam coating disposed on the particle. Again, it is to be understood that the terminology "disposed on" encompasses both partial and complete covering of the particle by the polymeric coating, a foam coating in this instance. The foam coating is typically useful for applications requiring enhanced contact between the proppant and crude oil. That is, the foam coating typically defines microchannels and increases a surface area for contact between crude oil and the catalyst and/or microorganism.

As set forth above, the polymeric coating is formed from the curable composition. Once formed, the polymeric coating is chemically and physically stable over a range of temperatures and does not typically melt, degrade, and/or shear off the particle in an uncontrolled manner when exposed to higher pressures and temperatures, e.g. pressures and temperatures greater than pressures and temperatures typically found on the earth's surface. As one example, the polymeric coating is particularly applicable when the proppant is exposed to significant pressure, compression and/or shear forces, and temperatures exceeding 200° C. (392° F.) in the subterranean formation and/or subsurface reservoir defined by the formation. The polymeric coating is generally viscous to solid nature, and depending on molecular weight.

The polymeric coating is present in the proppant in an amount of from 0.5 to 10, alternatively from 0.7 to 6, alternatively from 1 to 6, alternatively from 1 to 4, percent by weight based on the total weight of the proppant. The amount of polymeric coating present in the proppant may vary outside of the ranges above, but is typically both whole and fractional values within these ranges.

The polymeric coating may be formed in-situ where the polymeric coating is disposed on the particle during formation of the polymeric coating. Typically the components of the polymeric coating are combined with the particle and the polymeric coating is disposed on the particle.

However, in one embodiment a polymeric coating is formed and some time later applied to, e.g. mixed with, the particle and exposed to temperatures exceeding 100° C. (212° F.) to coat the particle and form the proppant. Advantageously, this embodiment allows the polymeric coating to be formed at a location designed to handle chemicals, under the control of personnel experienced in handling chemicals. Once formed, the polymeric coating can be transported to another location, applied to the particle, and heated. There are numerous logistical and practical advantages associated with this embodiment. For example, if the polymeric coating is being applied to the particle, e.g. frac sand, the polymeric coating may be applied immediately following the manufacturing of the frac sand, when the frac sand is already at elevated temperature, eliminating the need to reheat the polymeric coating and the frac sand, thereby reducing the amount of energy required to form the proppant.

In another embodiment, the curable composition can be formed in solution. The solution includes a solvent such as acetone or tetrahydrofuran (THF). The solution viscosity is controlled by stoichiometry, monofunctional reagents, and a polymer solids level. After the curable composition is formed in the solution, the solution is applied to the particle. The solvent evaporates leaving the curable composition/polymeric coating disposed on the particle. Once the polymeric coating is disposed on the particle to form the proppant, the proppant can be heated to further cure the polymeric coating. Generally, the curing, which occurs as a result of the heating, optimizes physical properties of the polymeric coating.

In yet another embodiment, the polymeric coating may also be further defined as controlled-release. That is, the polymeric coating may systematically dissolve, hydrolyze in a controlled manner, or physically expose the particle to the petroleum fuels in the subsurface reservoir. In one such embodiment, the polymeric coating typically gradually dissolves in a consistent manner over a pre-determined time period to decrease the thickness of the polymeric coating. This embodiment is especially useful for applications utilizing the active agent such as the microorganism and/or the catalyst. That is, the polymeric coating is typically controlled-release for applications requiring filtration of petroleum fuels or water.

The polymeric coating may exhibit excellent non-wettability in the presence of water, as measured in accordance with standard contact angle measurement methods known in the art. The polymeric coating may have a contact angle of greater than 90° and may be categorized as hydrophobic. Consequently, the proppant of such an embodiment can partially float in the subsurface reservoir and is typically useful for applications requiring foam coatings. Alternatively, the polymeric coating may be categorized as hydrophyllic.

Further, the polymeric coating typically exhibits excellent hydrolytic resistance and will not lose strength and durability when exposed to water. Consequently, the proppant can be submerged in the subsurface reservoir and exposed to water and will maintain its strength and durability.

The polymeric coating can be cured/cross-linked prior to pumping of the proppant into the subsurface reservoir, or the polymeric coating can be curable/cross-linkable whereby the polymeric coating cures in the subsurface reservoir due to the conditions inherent therein. These concepts are described further below.

The proppant of the subject disclosure may include the particle encapsulated with a cured polymeric coating. The cured polymeric coating typically provides crush strength, or resistance, for the proppant and prevents agglomeration of the proppant. Since the cured polymeric coating is cured before the proppant is pumped into a subsurface reservoir, the proppant typically does not crush or agglomerate even under high pressure and temperature conditions.

Alternatively, the proppant of the subject disclosure may include the particle encapsulated with a curable polymeric coating. The curable polymeric coating typically consolidates and cures subsurface. The curable polymeric coating is typically not cross-linked, i.e., cured, or is partially cross-linked before the proppant is pumped into the subsurface reservoir. Instead, the curable polymeric coating typically cures under the high pressure and temperature conditions in the subsurface reservoir. Proppants comprising the particle encapsulated with the curable polymeric coating are often used for high pressure and temperature conditions.

Additionally, proppants comprising the particle encapsulated with the curable polymeric coating may be classified as curable proppants, subsurface-curable proppants and partially-curable proppants. Subsurface-curable proppants typically cure entirely in the subsurface reservoir, while partially-curable proppants are typically partially cured before being pumped into the subsurface reservoir. The partially-curable proppants then typically fully cure in the subsurface reservoir. The proppant of the subject disclosure can be either subsurface-curable or partially-curable.

Multiple layers of the polymeric coating can be applied to the particle to form the proppant. As such, the proppant of the subject disclosure can include a particle having a cross-linked polymeric coating disposed on the particle and a curable polymeric coating disposed on the cross-linked coating, and vice versa. Likewise, multiple layers of the polymeric coating, each individual layer having the same or different physical properties can be applied to the particle to form the proppant. In addition, the polymeric coating can be applied to the particle in combination with coatings of different materials such as polyurethane coatings, polycarbodiimide coatings, polyamide imide coatings, polyisocyanurate coatings, polyoxizolidone coatings, polyacrylate coatings, epoxy coatings, furan coatings, sodium silicate coatings, hybrid coatings, and other material coatings.

The polymeric coating typically exhibits excellent adhesion to inorganic substrates. That is, the polymer wets out and bonds with inorganic surfaces, such as the surface of a sand particle, which consists primarily of silicon dioxide. As such, when the particle of the proppant is a sand particle, the polymeric coating bonds well with the particle to form a proppant which is especially strong and durable.

The proppant of the subject disclosure exhibits excellent thermal stability for high temperature and pressure applications. The polymeric coating is typically stable at temperatures greater than 200 (392), alternatively greater than 250 (572), ° C. (° F.). The thermal stability of the polymeric coating is typically determined by thermal gravimetric analysis (TGA).

Further, the polymeric coating does not degrade or delaminate from the particle at pressures (even at the temperatures described in the preceding paragraph) of greater than 51.7 MPa (7,500 psi), alternatively greater than 68.9 MPa (10,000 psi), alternatively greater than 86.2 MPa (12,500 psi), alternatively greater than 103.4 MPa (15,000 psi). Said differently, the proppant of this disclosure does not typically suffer from failure of the polymeric coating due to shear or degradation when exposed to the temperatures and pressures set forth in the preceding two paragraphs.

Further, with the polymeric coating of this disclosure, the proppant typically exhibits excellent crush strength, also commonly referred to as crush resistance. With this crush strength, the polymeric coating of the proppant is uniform and is substantially free from defects, such as gaps or indentations, which often contribute to premature breakdown and/or failure of the polymeric coating. In particular, the proppant typically exhibits a crush strength of 15 percent or less maximum fines as measured in accordance with American Petroleum Institute (API) RP60 or DIN EN ISO 13503-2 at pressures ranging from 51.7 MPa (7,500 psi) to 103.4 MPa (15,000 psi), including at specific stress pressures of 51.7 MPa (7,500 psi), 68.9 MPa (10,000 psi), 86.2 MPa (12,500 psi), and 103.4 MPa (15,000 psi).

When 40/70 Ottawa sand is utilized as the particle, a typical crush strength associated with the proppant of this disclosure is 15 percent or less, alternatively 10 percent or less, alternatively 5 percent or less maximum fines as measured in accordance with DIN EN ISO 13503-2 by compressing a proppant sample, which weighs 23.78 grams, 2 lb/ft$^2$ loading density, in a test cylinder (having a diameter of 1.5 inches as specified in DIN EN ISO 13503-2) for 2 minutes at 68.9 MPa (10,000 psi) and 23° C. (73° F.). After compression, percent fines and agglomeration are determined. As a comparison, uncoated sand typically has a crush strength of 21.7% fines under the same conditions.

In one embodiment, the proppant has an unconfined compressive strength of at least 0.69 MPa (150 psi), alternatively 1.37 MPa (200 psi). Compressive strength is tested by forming a porous plug after exposure to a standardized set of conditions (typical 250° F., 1000 psi, and DI water with 2% KCl for 24 hours). After forming a porous plug, it is removed from the test cell, cut into 3 inch pieces, and tested by tensile load until failure to determine unconfined compressive strength.

The polymeric coating of this disclosure typically provides a cushioning effect for the proppant and evenly distributes high pressures, e.g. closure stresses, around the proppant. Therefore, the proppant of the subject disclosure effectively props open fractures and minimizes unwanted impurities in unrefined petroleum fuels in the form of dust particles.

Although customizable according to carrier fluid selection, the proppant typically has a bulk density of from 0.1 to 3.0, alternatively from 1.0 to 2.5, alternatively from 1.0 to 2.0, alternatively from 1.1 to 1.9. One skilled in the art typically selects the specific gravity of the proppant according to the specific gravity of the carrier fluid and whether it is desired that the proppant be lightweight or substantially neutrally buoyant in the selected carrier fluid. Further, depending on the non-wettability of the polymeric coating, the proppant of such an embodiment typically has an apparent density of from 2.0 to 3.0, alternatively from 2.3 to 2.7, g/cm3 according to API Recommended Practices RP60 (or DIN EN ISO 13503-2) for testing proppants. It is believed that the non-wettability of the polymeric coating may contribute to flotation of the proppant depending on the selection of the carrier fluid in the wellbore.

Further, the proppant typically minimizes unpredictable consolidation. That is, the proppant only consolidates, if at all, in a predictable, desired manner according to carrier fluid selection and operating temperatures and pressures. Also, the proppant is typically compatible with low-viscosity carrier fluids having viscosities of less than 3,000 cps at 80° C. (176° F.) and is typically substantially free from mechanical failure and/or chemical degradation when exposed to the carrier fluids and high pressures. Finally, the proppant is typically coated via economical coating processes and typically does not require multiple coating layers, and therefore minimizes production costs.

As set forth above, the subject disclosure also provides the method of forming, or preparing, the proppant. The method of forming the proppant includes the steps of combining the isocyanate, the acrylate, and optionally the polyol to form the curable composition, coating the particle with the curable composition and curing the curable composition to form the polymeric coating.

The method of forming the proppant typically includes the steps of combining the isocyanate, the acrylate, and the polyol to form the curable composition, coating the particle with the curable composition and curing the curable composition to form the polymeric coating. It is to be appreciated that when the language "optionally the polyol" is used to describe the steps of the method that both embodiments with and without polyol are being described. Said differently, at least two distinct steps are being described.

For this method, the isocyanate, the acrylate, and optionally the polyol are typically provided. As with all other components which may be used in the method of the subject disclosure (e.g. the particle), the isocyanate and the acrylate are just as described above with respect to the curable composition and the polymeric coating formed therefrom.

The isocyanate, the acrylate, and optionally the polyol are combined to form the curable composition. The curable composition is not required to be formed prior to exposure of the particle to the individual components.

That is, the isocyanate, the acrylate, and optionally the polyol and other components may be combined to form the curable composition simultaneous with the coating of the particle with curable composition. Alternatively, as is indicated in certain embodiments below, the isocyanate, the acrylate, and optionally the polyol and other components may be combined to form the curable composition prior to the coating of the particle. The steps of combining and coating are conducted, either sequentially or simultaneously at a temperature of from −10 to 120, alternatively from −10 to 80, ° C.

Prior to the step of coating, the particle may optionally be heated to a temperature greater than 50° C. (122° F.) prior to or simultaneous with the step of coating the particle. If heated, a preferred temperature range for heating the particle is typically from 50 (122° F.) to 220° C. (428° F.). The particle may also optionally be pre-treated with a silicon-containing adhesion promoter prior to the step of coating the particle.

In this method, the steps of combining and coating the particle are typically collectively conducted in 60 minutes or less, alternatively in 30 minutes or less, alternatively in 1 to 20 minutes.

Various techniques can be used to coat the particle. These techniques include, but are not limited to, mixing, pan coating, fluidized-bed coating, co-extrusion, spraying, in-situ formation of the polymeric coating, and spinning disk encapsulation. The technique for applying the polymeric coating to the particle is selected according to cost, production efficiencies, and batch size.

In one embodiment, the curable composition is disposed on the particle via mixing in a vessel, e.g. a reactor. In particular, the individual components of the proppant, are added to the vessel to form a reaction mixture. The components may be added in equal or unequal weight ratios. The reaction mixture is typically agitated at an agitator speed commensurate with the viscosities of the components. Further, the reaction mixture is typically heated at a temperature commensurate with the polymeric coating technology and batch size. It is to be appreciated that the technique of mixing may include adding components to the vessel sequentially or concurrently. Also, the components may be added to the vessel at various time intervals and/or temperatures.

In another embodiment, the polymeric coating is disposed on the particle via spraying. In particular, individual components of the polymeric coating are contacted in a spray device to form a coating mixture. The coating mixture is then sprayed onto the particle to form the proppant. Spraying the polymeric coating onto the particle typically results in a uniform, complete, and defect-free polymeric coating disposed on the particle. For example, the polymeric coating is typically even and unbroken. The polymeric coating also typically has adequate thickness and acceptable integrity, which allows for applications requiring controlled-release of the proppant in the fracture. Spraying also typically results in a thinner and more consistent polymeric coating disposed on the particle as compared to other techniques, and thus the proppant is coated economically. Spraying the particle even permits a continuous manufacturing process. Spray temperature is typically selected by one known in the art according to polymeric coating technology and ambient humidity conditions. Further, one skilled in the art typically sprays the components of the polymeric coating at a viscosity commensurate with the viscosity of the components.

In another embodiment, the polymeric coating is disposed on the particle in-situ, i.e., in a reaction mixture comprising the components of the polymeric coating and the particle. In this embodiment, the polymeric coating is formed or partially formed as the polymeric coating is disposed on the particle. In-situ polymeric coating formation steps typically include providing each component of the polymeric coating, providing the particle, combining the components of the polymeric coating and the particle, and disposing the polymeric coating on the particle. In-situ formation of the polymeric coating typically allows for reduced production costs by way of fewer processing steps as compared to existing methods for forming a proppant.

The formed proppant is typically prepared according to the method as set forth above and stored in an offsite location before being pumped into the subterranean formation and the subsurface reservoir. As such, coating typically occurs offsite from the subterranean formation and subsurface reservoir. However, it is to be appreciated that the proppant may also be prepared just prior to being pumped into the subterranean formation and the subsurface reservoir. In this scenario, the proppant may be prepared with a portable coating apparatus at an onsite location of the subterranean formation and subsurface reservoir.

The method also includes the step of curing the curable composition to form the polymeric coating. The curable composition can be cured by heat, infrared radiation, ultraviolet radiation, aging/time, internal inclusion chemical free radical generator, external exposure to a chemical free radical generator, or any combination thereof to form the polymeric coating. The curable composition/polymeric coating may include an initiator. In one embodiment, the particle with the curable composition thereon is exposed to a chemical a free radical initiator, e.g. submerged in a water solution including a free radical initiator.

Once coated, the proppant can be heated to cure the curable composition or to further cure the polymeric coating. The curing optimizes physical properties of the polymeric coating as well as the performance of the proppant. In one embodiment, the proppant is heated to a temperature of greater than 150 (302), alternatively greater than 180 (356), ° C. (° F.). In one specific embodiment, the proppant is heated to the second temperature of 190° C. (374° F.) for 60 minutes. In another embodiment, the proppant is further heated by exposure to higher temperatures in the well.

The steps of combining the components to form the curable composition and the polymeric coating can be conducted sequentially. In one embodiment, the step of combining the isocyanate, the acrylate, and optionally the polyol to form the curable composition is further defined as first combining the isocyanate and the polyol and then combining the acrylate with the isocyanate and the polyol (or reaction product thereof). In this embodiment, a polyurethane pre-polymer is formed. The polyurethane pre-polymer can have isocyanate functionality which can further reacted with an acrylate having isocyanate functional groups (hydroxyl or amine) to form another isocyanate pre-polymer which has acrylate functionality and can be cured with a free radical initiator. Of course, the isocyanate and the polyol can react to form a polyurethane pre-polymer that is not isocyanate functional but can be mixed with another acrylate to form a curable composition which can be cured with a free radical initiator.

In another embodiment, the step of combining the isocyanate, the acrylate, and optionally the polyol to form the curable composition is further defined as first combining the isocyanate and the acrylate having isocyanate functional groups (hydroxyl or amine) and then combining the polyol with the isocyanate and the acrylate (or reaction product thereof). In this embodiment, a polyurethane pre-polymer having acrylate functionality is formed and optionally isocyanate functionality. When the polyurethane pre-polymer of this embodiment has isocyanate functionality, the polyurethane pre-polymer can further react with a polyol to form another isocyanate pre-polymer which has acrylate functionality and can be cured with a free radical initiator. Of course, the isocyanate and the polyol can react to form a polyurethane pre-polymer that is not isocyanate functional but can be mixed with another acrylate to form a curable composition which can be cured with a free radical initiator.

In yet another embodiment, the step of combining the isocyanate, the acrylate, and optionally the polyol to form the curable composition is further defined as first combining the isocyanate and a polycarbodiimide catalyst, e.g. a phospholene oxide, to form a polycarbodiimide prepolymer which may have isocyanate functionality. When the polycarbodiimide pre-polymer of this embodiment has isocyanate functionality, the polycarbodiimide pre-polymer can further react with a polyol and/or a isocyanate reactive acrylate to form another polycarbodiimide pre-polymer which has acrylate functionality and can be cured with a free radical initiator. Of course, the isocyanate can react to form a polycarbodiimide pre-polymer that is not isocyanate functional but can be mixed with another acrylate to form a curable composition which can be cured with a free radical initiator.

Depending on the sequence of the addition of components during the step of combining, various pre-polymers can be formed which can then be used to form and or react to form the polymeric coating. For example, the polymeric coating can be formed from a polyurethane pre-polymer optionally having acrylate functionality, polycarbodiimide functionality, and/or isocyanate functionality. As another example, the polymeric coating can be formed from a polycarbodiimide pre-polymer optionally having isocyanate functionality and/or acrylate functionality.

In one embodiment, a polycarbodiimide pre-polymer is formed and functionalized with methacrylic/acrylic acid acrylate functionality or other reactive functional groups (e.g. amine, acrylate, vinyl) which is then used to form the polymeric coating. This pre-polymer is discussed at length in U.S. Pat. No. 5,115,072, which is incorporated in its entirety herein.

Of course the step of combining the isocyanate, the acrylate, and optionally the polyol to form the curable composition can be further defined as first combining the polyol and the acrylate and then combining the isocyanate with the polyol and the acrylate. In such an embodiment, a pre-polymer is not typically formed.

The proppant is useful for hydraulic fracturing of the subterranean formation to enhance recovery of petroleum and the like. In a typical hydraulic fracturing operation, a hydraulic fracturing composition, i.e., a mixture, comprising the carrier fluid, the proppant, and optionally various other components, is prepared. The carrier fluid is selected according to wellbore conditions and is mixed with the proppant to form the mixture which is the hydraulic fracturing composition. The carrier fluid can be a wide variety of fluids including, but not limited to, kerosene and water. Typically, the carrier fluid is water. Various other components which can be added to the mixture include, but are not limited to, guar, polysaccharides, and other components know to those skilled in the art.

The mixture is pumped into the subsurface reservoir, which may be the wellbore, to cause the subterranean formation to fracture. More specifically, hydraulic pressure is applied to introduce the hydraulic fracturing composition under pressure into the subsurface reservoir to create or enlarge fractures in the subterranean formation. When the hydraulic pressure is released, the proppant holds the fractures open, thereby enhancing the ability of the fractures to extract petroleum fuels or other subsurface fluids from the subsurface reservoir to the wellbore.

For the method of filtering a fluid, the proppant of the subject disclosure is provided according to the method of forming the proppant as set forth above. In one embodiment, the subsurface fluid can be unrefined petroleum or the like. However, it is to be appreciated that the method of the subject disclosure may include the filtering of other subsurface fluids not specifically recited herein, for example, air, water, or natural gas.

To filter the subsurface fluid, the fracture in the subsurface reservoir that contains the unrefined petroleum, e.g. unfiltered crude oil, is identified by methods known in the art of oil extraction. Unrefined petroleum is typically procured via a subsurface reservoir, such as a wellbore, and provided as feedstock to refineries for production of refined products such as petroleum gas, naphtha, gasoline, kerosene, gas oil, lubricating oil, heavy gas, and coke. However, crude oil that resides in subsurface reservoirs includes impurities such as sulfur, undesirable metal ions, tar, and high molecular weight hydrocarbons. Such impurities foul refinery equipment and lengthen refinery production cycles, and it is desirable to minimize such impurities to prevent breakdown of refinery equipment, minimize downtime of refinery equipment for maintenance and cleaning, and maximize efficiency of refinery processes. Therefore, filtering is desirable.

For the method of filtering, the hydraulic fracturing composition is pumped into the subsurface reservoir so that the hydraulic fracturing composition contacts the unfiltered crude oil. The hydraulic fracturing composition is typically pumped into the subsurface reservoir at a rate and pressure such that one or more fractures are formed in the subterranean formation. The pressure inside the fracture in the subterranean formation may be greater than 5,000, greater than 7,000, or even greater than 68.9 MPa (10,000 psi), and the temperature inside the fracture is typically greater than 21° C. (70° F.) and can be as high 191° C. (375° F.) depending on the particular subterranean formation and/or subsurface reservoir.

Although not required for filtering, the proppant can be a controlled-release proppant. With a controlled-release proppant, while the hydraulic fracturing composition is inside the fracture, the polymeric coating of the proppant typically dissolves in a controlled manner due to pressure, temperature, pH change, and/or dissolution in the carrier fluid in a controlled manner or the polymeric coating is disposed about the particle such that the particle is partially exposed to achieve a controlled-release. Complete dissolution of the polymeric coating depends on the thickness of the polymeric coating and the temperature and pressure inside the fracture, but typically occurs within 1 to 4 hours. It is to be understood that the terminology "complete dissolution" generally means that less than 1 percent of the coating remains disposed on or about the particle. The controlled-release allows a delayed exposure of the particle to crude oil in the fracture. In the embodiment where the particle includes the active agent, such as the microorganism or catalyst, the particle typically has reactive sites that must contact the fluid, e.g. the crude oil, in a controlled manner to filter or otherwise clean the fluid. If implemented, the controlled-release provides a gradual exposure of the reactive sites to the crude oil to protect the active sites from saturation. Similarly, the active agent is typically sensitive to immediate contact with free oxygen. The controlled-release provides the gradual exposure of the active agent to the crude oil to protect the active agent from saturation by free oxygen, especially when the active agent is a microorganism or catalyst.

To filter the fluid, the particle, which is substantially free of the polymeric coating after the controlled-release, contacts the subsurface fluid, e.g. the crude oil. It is to be understood that the terminology "substantially free" means that complete dissolution of the polymeric coating has occurred and, as defined above, less than 1 percent of the polymeric coating remains disposed on or about the particle. This terminology is commonly used interchangeably with the terminology "complete dissolution" as described above. In an embodiment where an active agent is utilized, upon contact with the fluid, the particle typically filters impurities such as sulfur, unwanted metal ions, tar, and high molecular weight hydrocarbons from the crude oil through biological digestion. As noted above, a combination of sands/sintered ceramic particles and microorganisms/catalysts are particularly useful for filtering crude oil to provide adequate support/propping and also to filter, i.e., to remove impurities. The proppant therefore typically filters crude oil by allowing the delayed exposure of the particle to the crude oil in the fracture.

The filtered crude oil is typically extracted from the subsurface reservoir via the fracture, or fractures, in the subterranean formation through methods known in the art of oil extraction. The filtered crude oil is typically provided to oil refineries as feedstock, and the particle typically remains in the fracture.

Alternatively, in a fracture that is nearing its end-of-life, e.g. a fracture that contains crude oil that cannot be economically extracted by current oil extraction methods, the particle may also be used to extract natural gas as the fluid from the fracture. The particle, particularly where an active agent is utilized, digests hydrocarbons by contacting the reactive sites of the particle and/or of the active agent with the fluid to convert the hydrocarbons in the fluid into propane or methane. The propane or methane is then typically harvested from the fracture in the subsurface reservoir through methods known in the art of natural gas extraction.

The following examples are meant to illustrate the disclosure and are not to be viewed in any way as limiting to the scope of the disclosure.

EXAMPLES

Polymeric Coatings 1-4

Polymeric Coatings 1-4 are formed from curable compositions according to the subject disclosure. Polymeric Coatings 1-4 are formed with the components listed in Table 1 below. The amounts in Table 1 are in grams, unless otherwise specified.

Polymeric Coatings 1-4 are formed with a curable composition that comprises Isocyanate A, Polyol A or B, Acrylate Monomer A, and Catalyst A. To form Polymeric Coatings 1-4, a pre-polymer is made by adding Isocyanate A along with a single drop of Catalyst A (~0.02 g) to a reaction vessel. Polyol A or B is then added slowly to the reaction vessel over 30 minutes. The mixture of the Isocyanate A, the Catalyst A, and the Polyol A or B is mixed for 1.5 hours at 70-80° C. to form a polyurethane pre-polymer (in Examples 1 and 2 having isocyanate functionality and in Examples 3 and 4 having isocyanate and acrylate functionality). Acrylate Monomer A (which has hydroxyl functionality) is added, all at once, to the reaction vessel.

The mixture of the polyurethane pre-polymer (which has isocyanate functionality) and the Acrylate Monomer A is agitated to form the curable composition.

Activator A is added to the curable composition. Film plaques of the curable composition are then formed with a draw-down bar on a number 10 setting. The curable composition is heated to a temperature of 123° C. for greater than 5 minutes to cure the curable composition and form Polymeric Coatings 1-4. Examples 1 and 3 hardened in 5 minutes, Example 2 hardened in 8 minutes, and Example 4 took longer than 8 minutes to harden.

TABLE 1

|  | PC 1 | PC 2 | PC 3 | PC 4 |
|---|---|---|---|---|
| Step 1 | | | | |
| Isocyanate A | 36.22 | 36.22 | 39.24 | 39.24 |
| Polyol A | 13.59 | 13.59 | — | — |
| Polyol B | — | — | 6.37 | 6.37 |
| Catalyst A | 0.05 | 0.05 | 0.05 | 0.05 |
| Step 2 | | | | |
| Acrylate Monomer A | 50.19 | 50.19 | 54.39 | 54.39 |
| Step 3 | | | | |
| Polyurethane Pre-polymer | 10.0 | 10.0 | 10.0 | 10.0 |
| Free Radical Generator A | 0.07 | 0.02 | 0.07 | 0.03 |
| Physical Properties | | | | |
| $T_g$ (° C.) | 24/58 | — | — | — |
| Melting Endotherm (° C.) | 108/180 | — | — | — |
| Shore D Hardness | 80-85 | 65-70 | 75-85 | 85 |
| TGA 10% Wt. Loss (° C.) | 302 | 287 | 308 | 308 |

Isocyanate A is diphenylmethane diisocyanate having an NCO content of 33.5 weight percent, a nominal functionality of 2.0, and a viscosity at 25° C. of 15 cps.

Polyol A is a tri-functional polyol formed via the reaction of propylene oxide and trimethylol propane, having hydroxyl number of from 383 to 413 mg KOH/g and a viscosity at 25° C. of 600 cps.

Polyol B is a tri-functional polyol having a hydroxyl number of 920 mg KOH/g and a viscosity at 25° C. of 3400 cps.

Acrylate Monomer A is hydroxyethyl methacrylate.

Catalyst A is 33 wt. % solution of triethylenediamine in dipropylene glycol.

Free Radical Generator A is 2,2'-Azobis(2-methylbutyronitrile).

Polymeric Coatings 5-10

Polymeric Coatings 5-10 are also from curable compositions according to the subject disclosure. Polymeric Coatings 5-10 are formed with the components listed in Table 2 below. The amounts in Table 2 are in grams, unless otherwise specified.

To form Polymeric Coatings 5-9, a pre-polymer is formed by adding Isocyanate A along with a drop of Catalyst A and/or B, and Acrylate Monomer B to a reaction vessel. The mixture of the Isocyanate A, the Catalyst A and/or B, and the Acrylate Monomer B (which is hydroxyl functional) is mixed for 1.5 hours at 70-80° C. to form curable compositions 5-9 comprising the polyurethane pre-polymer which has acrylic functionality.

Activator A is added to the curable composition. Film plaques of the curable composition are then formed with a draw-down bar on a number 10 setting. The curable composition is heated to a temperature of 120° C. for 30 minutes to cure the curable composition and form Polymeric Coatings 5-9.

Polymeric Coating 10 is formed with a curable composition that comprises Isocyanate A, Polyol C, Acrylate Monomer B, and Catalyst A. To form Polymeric Coatings 1-4, a polyurethane pre-polymer having acrylic and isocyanate functionality is made by adding Isocyanate A, Acrylate Monomer B, and a drop of Catalyst A to a reaction vessel. Polyol C is then added slowly to the reaction vessel over 30 minutes. The mixture of the polyurethane pre-polymer having acrylic and isocyanate functionality and the Polyol C having hydroxyl functionality is mixed for 1.5 hours at 70-80° C.

Activator A is added to the curable composition. Film plaques of the curable composition are then formed with a draw-down bar on a number 10 setting. The curable composition is heated to a temperature of 120° C. for 30 minutes to cure the curable composition and form Polymeric Coating 10.

TABLE 2

|  | PC 5 | PC 6 | PC 7 | PC 8 | PC 9 | PC 10 |
|---|---|---|---|---|---|---|
| Step 1 | | | | | | |
| Isocyanate A | 52.44 | 5.11 | 2.46 | 0.63 | 13.48 | 27.25 |
| Acrylate Monomer B | 30.19 | 2.94 | 1.86 | 0.37 | 1.86 | 15.69 |
| Catalyst A | 0.05 | — | — | — | — | .002 |
| Catalyst B | — | 0.02 | — | — | 0.25 | — |
| Solvent A | — | — | 7.00 | — | 15.00 | 29.29 |
| Step 2 | | | | | | |
| Polyol C | — | — | — | — | — | 57.06 |
| Step 3 | | | | | | |
| Pre-polymer | — | — | — | 1 | — | — |
| Free Radical Generator A | — | — | — | .02 | — | — |
| Physical Properties (DSC; Heat-Cool-Heat, Second Numbers) | | | | | | |
| $T_g$ (° C.) | 44, 150 | 61, 114 | 65, 115 | — | 34, 149 | No $T_g$ |

Polyol C is a bi-functional polyol formed via the reaction of propylene oxide and propylene glycol, having hydroxyl number of from 102 to 112 mg KOH/g and a viscosity at 25° C. of 150 cps.

Acrylate Monomer B is 2-hydroxypropyl methacrylate (CAS No 6674-22-1).

Catalyst B is 3-methyl-1-phenyl-2-phospholene oxide.

Solvent A is Tetrahydrofuran.

Polymeric Coatings 11-15

Polymeric Coatings 11-15 are also formed from polyurethane pre-polymers according to the subject disclosure. Polymeric Coatings 11-15 are formed with the components listed in Table 3 below. The amounts in Table 3 are in grams, unless otherwise specified.

To form Polymeric Coatings 11-15, a pre-polymer is formed by adding Isocyanate B, Polyol, Acrylate Monomer B, and optionally Activator A are added to the reaction vessel. The polyurethane pre-polymer and the Acrylate Monomer B are mixed for 4 minutes at 170° C. to form the Polymeric Coatings 11-15.

TABLE 3

|  | PC. 11 | PC. 12 | PC. 13 | PC. 14 | PC. 15 |
|---|---|---|---|---|---|
| Polyurethane Pre-polymer Step 1 | | | | | |
| Isocyanate B | 48.65 | 48.59 | 48.53 | 48.48 | 48.00 |
| Polyol A | 46.22 | 41.13 | 36.03 | 30.91 | 30.61 |
| Step 2 | | | | | |
| Acrylate Monomer B | 5.14 | 10.28 | 15.44 | 20.61 | 20.40 |
| Polymeric Coating | | | | | |
| Pre-polymer | — | — | — | — | 99.01 |
| Free Radical Generator A | — | — | — | — | 0.500 |
| Physical Properties | | | | | |
| $T_g$ | >120° C. | >120° C. | >120° C. | >120° C. | >120° C. |

Isocyanate B is polymeric diphenylmethane diisocyanate having an NCO content of 31.4 weight percent, a nominal functionality of 2.7, and a viscosity at 25° C. of 200 cps.

Examples 1-4

Examples 1-4 are proppants formed according to the subject disclosure. The polymeric coatings of Examples 1-4 are formed with the components listed in Table 4 below. The amounts in Table 4 are in grams, unless otherwise specified.

A curable composition comprising Isocyanate B, Catalyst A, Polyol A, and Acrylate Monomer B is used to form the polymeric coatings of Examples 1-4. To form the polymeric coatings, Isocyanate B, a drop of Catalyst C, Polyol A, and Acrylate Monomer A are added all at once to a Hobart mixer heated to a temperature of 170° C. and having Particle A therein. The components are mixed for 4 minutes to form Examples 1-4.

Examples 1-4 are tested for crush resistance. The appropriate formula for determining percent fines is set forth in DIN EN ISO 13503-2. The crush strength of Examples 1-4 are tested by compressing a proppant sample, which weighs 40 grams, in a test cylinder (having a diameter of 5 cm (2 in) as specified in DIN EN ISO 13503-2) with a 2 minute ramp rate and for 2 minutes at 55.2 MPa (8000 psi) and 23° C. (73° F.). The crush strength values for Examples 1-4 are also set forth in Table 4 below.

TABLE 4

|  | Ex. 1 | Ex. 2 | Ex. 3 | Ex. 4 |
|---|---|---|---|---|
| Isocyanate B | 48.65 | 48.59 | 48.53 | 48.48 |
| Acrylate Monomer B | 46.22 | 41.13 | 36.03 | 30.91 |
| Acrylate Monomer B | 5.14 | 10.28 | 15.44 | 20.61 |
| Proppant | | | | |
| Particle A | 100 | 100 | 100 | 100 |
| Polymeric Coating | 3.00 | 3.00 | 3.00 | 3.00 |
| Crush Strength | | | | |
| Crush Strength (% Fines < 40 sieve) | 3.4 | 6.1 | 7.4 | 10.8 |
| Crush Strength (% Fines < 40 sieve) 3 hours in $H_2O$ | 3.2 | 5.7 | 5.5 | 10.9 |
| Crush Strength (% Fines < 40 sieve) 3 hours in $H_2O$, Sodium Persulfate (1% by weight coating) | 3.83 | 3.61 | 3.33 | 7.04 |

Catalyst C is a tin catalyst.

Particle A is Hickory sand having a sieve size of 20/40 (US Sieve No.) or 0.841/0.420 (mm).

Examples 5-10

Examples 5-10 are proppants formed according to the subject disclosure. The polymeric coatings of Examples 5-10 are formed with the components listed in Table 5 below. The amounts in Table 5 are in grams, unless otherwise specified.

To form Examples 5-10, Particle A is added to a Hobart mixer and heated to a temperature of 170° C. Isocyanate B and Acrylate Monomer B are then added to the Hobart mixer and mixed for 4 minutes to form Examples 5-10. This is referred to herein as in-situ formation of a pre-polymer.

Examples 5-10 are tested for crush strength according to the parameters set forth above (for Examples 1-4). The crush strength values for Examples 5-10 are also set forth in Table 5 below.

TABLE 5

|  | Ex. 5 (110-1) | Ex. 6 (110-2) | Ex. 7 (110-3) | Ex. 8 (110-4) | Ex. 8 (110-5) | Ex. 8 (110-6) |
|---|---|---|---|---|---|---|
| Step 1 | | | | | | |
| Isocyanate B | 80 | 70 | 60 | 50 | 70 | 70 |
| Acrylate Monomer B | 20 | 30 | 40 | 50 | 30 | 30 |
| Catalyst B | 0.05 | 0.05 | 0.05 | 0.05 | 0.05 | 0.05 |
| Free Radical Generator A | — | — | — | — | 1 | 2 |
| Proppants | | | | | | |
| Particle A | 500 | 500 | 500 | 500 | 500 | 500 |
| Polymeric Coating | 15 | 15 | 15 | 15 | 15 | 15 |
| Crush Strength | | | | | | |
| Crush Strength (% Fines <40 sieve) | 11.5 | 12.3 | 16.7 | 20.1 | — | — |
| Crush Strength (% Fines <40 sieve) 16 hours in DI $H_2O$ @ 120° C. | — | — | — | — | 15.3 | 16.9 |

Examples 11 and 12

Examples 11 and 12 are proppants formed according to the subject disclosure. The polymeric coatings of Examples 11 and 12 are formed with the components listed in Table 6 below. The amounts in Table 6 are in grams, unless otherwise specified.

To form Examples 11 and 12, Particle A is added to a Hobart mixer and heated to a temperature of 170° C. Isocyanate B, Acrylate Monomer B, Catalyst B, Free Radical Generator B, and other additives are added to the Hobart mixer. These components are mixed are mixed for 4 minutes at 170° C. to form each respective Example.

Examples 11 and 12 are tested for crush strength according to the parameters set forth above (for Examples 1-4). The crush strength values for Examples 11 and 12 are also set forth in Table 6 below.

TABLE 6

|  | Ex. 5 (113-3) | Ex. 6 (113-4) |
|---|---|---|
| Isocyanate B | 10.5 | 10.5 |
| Acrylate Monomer B | 4.5 | 4.5 |
| Catalyst B | 0.18 | 0.36 |
| Colorant | 0.01 | 0.01 |
| Free Radical Generator B | 0.15 | 0.15 |
| Proppants | | |
| Particle A | 500 | 500 |
| Polymeric Coating | 15 | 15 |
| Surface Treatment | 0.1 | 0.1 |
| Physical Properties | | |
| Crush Strength (% Fines < 40 sieve) | 13.4 | 14.4 |
| Crush Strength (% Fines < 40 sieve) 24 hours in $H_2O$ | 12.1 | 7.6 |
| Crush Strength (% Fines < 40 sieve) 24 hours in $H_2O$ | 13.4 | 7.9 |

Free Radical Generator B is 2,2'-Azobis[2-methyl-N-(2-hydroxyethyl)propionamide].

Colorant is CHROMATINT YELLOW® X-2742.

Surface Treatment is dicocoyl ethyl hydroxyethylmonium methosulfate.

Example 13

Example 13 is a proppant formed according to the subject disclosure. The polymeric coating of Example 13 is formed with the components listed in Table 7 below. The amounts in Table 7 below are in grams, unless otherwise specified.

To form Example 13, a pre-polymer is formed by adding Isocyanate B, Polyol D, and Catalyst B, to a reaction vessel. These components are mixed for 4 minutes at 48° C. to form the polyurethane pre-polymer having isocyanate functionality of Example 13. The pre-polymer is mixed with Acrylate Monomer B and added a Hobart mixer and mixed for 2 minutes to form Example 13.

TABLE 7

|  | Ex. 13 |
|---|---|
| Step 1 | |
| Isocyanate B | 5.06 |
| Polyol D | 2.51 |
| Catalyst A | 0.1 |
| Step 2 | |
| Acrylate Monomer B | 2.42 |
| Free Radical Generator A | 0.07 |
| Proppant | |
| Particle A | 200 |
| Polymeric Coating | 10.16 |

Polyol D is a sucrose glycerin initiated polyether polyol having hydroxyl number of from 470 mg KOH/g and a viscosity at 25° C. of 3500 cps.

Polymeric Coatings 16-21

Polymeric Coatings 16-21 are also formed according to the subject disclosure. Polymeric Coatings 16-21 are formed with the components listed in Table 8 below. The amounts in Table 8 are in grams, unless otherwise specified.

Polymeric Coatings 16-21 are formed with a coating composition that comprises Isocyanate B, Polyol A, Acrylate Monomer B (which is hydroxyl functional), Catalyst C, and Acrylate Monomer C (which is not hydroxyl functional). Said differently, this embodiment is formed with a mixture of a polyurethane pre-polymer having acrylate functionality (the reaction product of Isocyanate B, Polyol A, and Acrylate Monomer B, in the presence of Catalyst C) and Acrylate Monomer C, which is not hydroxy functional, and thus does not react to with the polyurethane pre-polymer having acrylate functionality until the coating composition is exposed to Free Radical Generator B, i.e., cured.

To form Polymeric Coatings 22-27, Isocyanate B, Polyol A, Acrylate Monomer B, Catalyst C, and Acrylate Monomer C are added to a reaction vessel and mixed for 4 minutes at 170° C. Sample plaques are then formed from the coating composition. The plaques are submerged in an aqueous solution of Free Radical Generator B at 120° C. for 3 hours to cure the coating composition and form the polymeric coatings.

TABLE 8

|  | PC 16 | PC 17 | PC 18 | PC 19 | PC 20 | PC 21 |
|---|---|---|---|---|---|---|
| Isocyanate B | 48.65 | 46.29 | 43.86 | 41.40 | 38.94 | 34.08 |
| Acrylate Monomer B | 5.14 | 4.86 | 4.61 | 4.35 | 4.09 | 3.58 |
| Polyol A | 46.22 | 43.90 | 41.60 | 39.26 | 36.98 | 32.32 |
| Acrylate Monomer C | — | 4.95 | 9.93 | 14.99 | 20.03 | 30.01 |
| Catalyst C | .05 | .05 | .05 | .05 | .05 | .05 |

TABLE 8-continued

|  | PC 16 | PC 17 | PC 18 | PC 19 | PC 20 | PC 21 |
|---|---|---|---|---|---|---|
| Physical Properties | | | | | | |
| Durometer Shore D | — | 78 | 71 | 80 | 78 | 78 |
| Duroeter Shore D (3 hours in an H20/Free Radical Generator B solution, 120° C.) | — | 85 | 80 | 82 | 80 | 78 |

Acrylate Monomer C is 2-ethylhexyl acrylate.

Polymeric Coatings 22-27

Polymeric Coatings 22-27 are also formed according to the subject disclosure. Polymeric Coatings 22-27 are formed with the components listed in Table 9 below. The amounts in Table 9 are in grams, unless otherwise specified.

Polymeric Coatings 22-27 are formed with a coating composition that comprises Isocyanate B, Polyol A, Acrylate Monomer B (which is hydroxyl functional), Catalyst C, and Acrylate Monomer D (which is not hydroxyl functional). Said differently, this embodiment is formed with a mixture of a polyurethane pre-polymer having acrylate functionality (the reaction product of Isocyanate B, Polyol A, and Acrylate Monomer B, in the presence of Catalyst C) and Acrylate Monomer D, which is not hydroxy functional, and thus does not react to with the polyurethane pre-polymer having acrylate functionality until the coating composition is exposed to Free Radical Generator B, i.e., cured.

To form Polymeric Coatings 22-27, Isocyanate B, Polyol A, Acrylate Monomer B, Catalyst C, and Acrylate Monomer D are added to a reaction vessel and mixed for 4 minutes at 170° C. The resulting composition, i.e., the curable composition, is added to a weigh pan and analyzed.

TABLE 9

|  | PC 22 | PC 23 | PC 24 | PC 25 | PC 26 | PC 27 |
|---|---|---|---|---|---|---|
| Isocyanate B | 48.59 | 46.29 | 43.86 | 41.40 | 38.94 | 34.08 |
| Acrylate Monomer B | 10.28 | 4.86 | 4.61 | 4.35 | 4.09 | 3.58 |
| Polyol A | 48.59 | 43.90 | 41.60 | 39.26 | 36.98 | 32.32 |
| Acrylate Monomer D | — | 4.95 | 9.93 | 14.99 | 20.03 | 30.01 |
| Catalyst C | .05 | .05 | .05 | .05 | .05 | .05 |
| Physical Properties | | | | | | |
| Durometer Shore D | — | 79 | 80 | 68 | 71 | 80 |
| Durometer Shore D (3 hours in an H₂0/Free Radical Generator B solution, 120° C.) | — | 84 | 78 | 82 | 84 | 78 |

Acrylate Monomer D is hexanediol diacrylate.

Example 14

Example 14 is a proppant formed according to the subject disclosure. The polymeric coating of Example 14 is formed with the components listed in Table 10 below. The amounts in Table 10 below are in grams, unless otherwise specified.

Example 14 is a proppant that is formed with a coating composition that comprises Isocyanate B, Polyol A, Acrylate Monomer B (which is hydroxyl functional) and Acrylate Monomer D (which is not hydroxyl functional). Said differently, this embodiment is formed with a mixture of a polyurethane pre-polymer having acrylate functionality and (the reaction product of Isocyanate B, Polyol A, Acrylate Monomer B), Catalyst C, and Acrylate Monomer D, which is not hydroxy functional, and thus does not react to with the polyurethane pre-polymer until it is exposed to Free Radical Generator B and cured.

To form Example 14, Isocyanate B, Polyol A, Acrylate Monomer B, Catalyst C, and Acrylate Monomer D are added to a Hobart Mixer having Particle A heated to a temperature of 100° C. therein. The components are then mixed for 2 minutes at 100-103° C. to form Particle A having the coating composition thereon. Particle A having the coating composition thereon is then submerged in an aqueous solution of Free Radical Generator B at 120° C. for 3 hours to cure the coating composition and form the polymeric coating.

TABLE 10

|  | Ex. 14 |
|---|---|
| Isocyanate B | 7.76 |
| Polyol A | 6.59 |
| Acrylate Monomer B | 1.64 |
| Acrylate Monomer D | 4.01 |
| Catalyst C | .05 |
| Acrylate Monomer B | 2.42 |
| Free Radical Generator A | 0.07 |
| Particle A | 500 |
| Polymeric Coating | 10.16 |

Examples 15 and 16

Examples 15 and 16 are proppants formed according to the subject disclosure. The polymeric coatings of Examples 15 and 16 are formed with the components listed in Table 11 below. The amounts in Table 11 below are in grams, unless otherwise specified.

Examples 15 and 16 are formed with a coating composition that comprises the reaction product of Polyol A, Acrylate Monomers B and E, and Isocyanate B.

To form Examples 15 and 16, Polyol A, Acrylate Monomers B and E, Catalyst D, Isocyanate B, Colorant, and Peroxide are added to a Hobart Mixer having Particle A heated to a temperature of 80° C. therein. The components are then mixed for 2 minutes at temperature setting of 80° C. to form a proppant comprising Particle B having a polymeric coating thereon.

TABLE 11

|  | Ex. 15 | Ex. 16 |
|---|---|---|
| Polyol A | 3.09 | 7.62 |
| Acrylate Monomer B | 7.22 | 1.96 |
| Acrylate Monomer E | — | 1.31 |
| Catalyst D | 0.06 | 0.06 |
| Isocyanate B | 9.63 | 9.08 |

TABLE 11-continued

|  | Ex. 15 | Ex. 16 |
| --- | --- | --- |
| Free Radical Generator C | 0.07 | 0.03 |
| Colorant | 0.10 | 0.10 |
| Total Coating Amount | 20 | 20 |
| Particle B | 500 | 500 |
| Polymeric Coating (% by wt. proppant) | 3.85 | 3.85 |

Particle B is Northern White Sand having a sieve size of 20/40 (US Sieve No.) or 0.841/0.420 (mm).

Acrylate Monomer E is 1,4 butanediol dimethyacrylate (BDODM).

Catalyst D is 1,8-Diazabicyclo[5.4.0]undec-7-ene, CAS No. 6674-22-2 (DBU).

Free Radical Generator C is tert-Butylperoxy 2-ethylhexyl carbonate, CAS No. 34443-12-4 (TBEC).

Examples 15 and 16 are tested for unconfined compressive strength and crush resistance. The testing results and testing parameters are set forth in Table 12 below.

Compressive strength is tested by forming a porous plug after exposure to a standardized set of conditions (typical 250° F., 1000 psi, and DI water with 2% KCl for 24 hours). After forming a porous plug, it is removed from the test cell, cut into 3 inch pieces, and tested by tensile load until failure to determine unconfined compressive strength.

Crush resistance is determined with the formula for determining percent fines set forth in DIN EN ISO 13503-2. The crush resistance is tested by compressing a proppant sample, which weighs 40 grams, in a test cylinder (having a diameter of 5 cm (2 in) as specified in DIN EN ISO 13503-2) with a 2 minute ramp rate and for 2 minutes at 68.95 MPa (10,000 psi) and 23° C. (73° F.).

TABLE 12

|  | Ex. 15 | Ex. 16 |
| --- | --- | --- |
| Unconfined Compressive Strength MPa (PSI) | 3.34 (484) | 2.39 (346) |
| Crush Resistance | 7.3 | 4.2 |

Referring now to Table 12, the Examples 15 and 16 have excellent unconfined compressive strength and crush resistance. Further, the process is conducted quickly and at relatively low temperatures (80° C.).

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A proppant for hydraulically fracturing a subterranean formation, said proppant comprising:
   A. a particle present in an amount of from 90 to 99.5 percent by weight based on the total weight of said proppant; and
   B. a polymeric coating disposed about said particle and present in an amount of from 0.5 to 10 percent by weight based on the total weight of said proppant, said polymeric coating formed from a curable composition comprising:
      an isocyanate comprising diphenylmethane diisocyanate and/or polymeric diphenylmethane diisocyanate included in said curable composition in an amount of from 10 to 90 percent by weight based on the total weight of all components used to form said curable composition,
      an acrylate comprising a hydroxy-functional acrylate monomer selected from the group of glycerol monomethacrylate, 2-hydroxyethyl acrylate, hydroxyethyl methacrylate, 2-hydroxypropyl methacrylate, hydroxybutyl methacrylate, N-(2-hydroxypropyl)methacrylamide, poly ethoxy (10) ethyl methacrylate, pentaerythritol triacrylate, and combinations thereof, said acrylate included in said curable composition in an amount of from 10 to 70 percent by weight based on the total weight of all components used to form said curable composition, and a polyether polyol included in said curable composition in an amount of from 10 to 70 percent by weight based on the total weight of all components used to form said curable composition.

2. A proppant as set forth in claim 1 wherein said curable composition further comprises a catalyst selected from the group of phosphorous compounds, tertiary amines, basic metal compounds, carboxylic acid metal salts, non-basic organo-metallic compounds, and combinations thereof.

3. A proppant as set forth in claim 1 wherein said curable composition comprises a chemical free radical generator selected from peroxides, azo compounds, and combinations thereof.

4. A proppant as set forth in claim 1 wherein said curable composition further comprises an amine-functional acrylate monomer.

5. A proppant as set forth in claim 1 wherein said curable composition comprises a hydroxyalkyl methacrylate.

6. A proppant as set forth in claim 1 wherein said isocyanate comprises a polymeric isocyanate having an NCO content of about 31.5 weight percent.

7. A proppant as set forth in claim 1 wherein said isocyanate is included in said curable composition, in an amount of from 20 to 70 percent by weight based on the total weight of all components used to form said curable composition, said acrylate is included in said curable composition, in an amount of from 10 to 70 percent by weight based on the total weight of all components used to form said curable composition, and said polyol is included in said curable composition, in an amount of from 10 to 70 percent by weight based on the total weight of all components used to form said curable composition.

8. A proppant as set forth in claim 1 wherein said particle is selected from the group of minerals, ceramics, sands, nut shells, gravels, mine tailings, coal ashes, rocks, smelter slag, diatomaceous earth, crushed charcoals, micas, sawdust, wood chips, resinous particles, polymeric particles, and combinations thereof.

9. A proppant as set forth in claim 1 that is thermally stable at temperatures greater than 200° C.

10. A proppant as set forth in claim 1 that has an unconfined compressive strength of at least 0.69 MPa (150 psi).

11. A method of hydraulically fracturing a subterranean formation which defines a subsurface reservoir with a mixture comprising a carrier fluid and a proppant as set forth in claim 1, said method comprising the step of pumping the mixture into the subsurface reservoir to fracture the subterranean formation.

12. A method of forming a proppant for hydraulically fracturing a subterranean formation, wherein the proppant comprises a particle and a polymeric coating disposed about the particle, the polymeric coating formed from a curable composition comprising an isocyanate comprising diphenylmethane diisocyanate and/or polymeric diphenylmethane diisocyanate, an acrylate comprising a hydroxy-functional acrylate monomer selected from the group of glycerol monomethacrylate, 2-hydroxyethyl acrylate, hydroxyethyl methacrylate, 2-hydroxypropyl methacrylate, hydroxybutyl methacrylate, N-(2-hydroxypropyl)methacrylamide, poly ethoxy (10) ethyl methacrylate, pentaerythritol triacrylate, and combinations thereof, and a polyether polyol, said method comprising the steps of:

A. combining the isocyanate comprising diphenylmethane diisocyanate and/or polymeric diphenylmethane diisocyanate, the hydroxy-functional acrylate monomer, and the polyether polyol to form the curable composition;

B. coating the particle with the curable composition; and

C. curing the curable composition to form the polymeric coating;

wherein said isocyanate is included in said curable composition in an amount of from 10 to 90 percent by weight based on the total weight of all components used to form said curable composition, said acrylate is included in said curable composition, in an amount of from 10 to 70 percent by weight based on the total weight of all components used to form said curable composition, and said polyol is included in said curable composition, in an amount of from 10 to 70 percent by weight based on the total weight of all components used to form said curable composition; and wherein the particle is present in an amount of from 90 to 99.5 percent by weight based on the total weight of the proppant and the polymeric coating is present in an amount of from 0.5 to 10 percent by weight based on the total weight of the proppant.

13. A method as set forth in claim 12 wherein the step of combining is conducted simultaneous with the step of coating.

14. A method as set forth in claim 13 wherein the steps of combining and coating are conducted at a temperature of from −10 to 80° C. and/or are collectively conducted in 10 minutes or less.

15. A method as set forth in claim 12 wherein the step of curing the curable composition to form the polymeric coating is further defined as heating the particle with the curable composition thereon.

16. A method as set forth in claim 12 wherein the step of curing the curable composition to form the polymeric coating is further defined as exposing the particle with the curable composition thereon to a free radical initiator.

17. A method as set forth in claim 12 wherein the step of combining the isocyanate, the acrylate, and the polyol to form the curable composition is further defined as first combining the polyol and the acrylate and then combining the isocyanate with the polyol and the acrylate.

18. A method as set forth in claim 12 wherein the polymeric coating is formed from a polyurethane pre-polymer having acrylate functionality, polycarbodiimide functionality, and/or isocyanate functionality.

* * * * *